United States Patent [19]

Wegener

[11] Patent Number: 4,517,690

[45] Date of Patent: May 21, 1985

[54] AIR PALLET HAVING MULTIPLE ENTRY INTEGRATED AIR INLET VALVES

[76] Inventor: Jack Wegener, Rte. #2, Box #195, Preston, Md. 21655

[21] Appl. No.: 612,117

[22] Filed: May 21, 1984

[51] Int. Cl.³ .......................... B65G 7/06; A61G 7/08

[52] U.S. Cl. .......................................... 5/81 R; 5/453; 180/125; 414/676

[58] Field of Search ............... 5/81 R, 81 B, 453, 454, 5/423, 469, 449; 180/125, 124, 116; 414/676; 254/93 HP

[56] References Cited

U.S. PATENT DOCUMENTS 3,739,407 6/1973 Stiller .................................... 5/81 B
3,948,344 4/1976 Johnson et al. ...................... 180/124
4,272,856 6/1981 Wegener et al. ..................... 5/81 R

*Primary Examiner*—Alexander Grosz
*Attorney, Agent, or Firm*—Sughrue, Mion, Zinn, Macpeak, and Seas

[57] ABSTRACT

An air pallet such as a patient mover which may be formed of upper and lower thin flexible film sheets sealed at their edges to form a plenum chamber therebetween, functions to move with minimal friction, a load supported by a generally rigid planar backing member, which may be the load itself, over an underlying generally planar fixed support surface. The bottom thin flexible material sheet is perforated by small diameter perforations such as pin holes at the load imprint area. Dual opposed air inlets permit pressurization of the plenum chamber by insertion of a wand connected to a source of pressurized air into one of the air inlets. Air escaping from the perforations creates an air bearing between the fixed support surface and the bottom thin flexible film material sheet. A pair of flexible strips are interposed at laterally opposed inlets within the plenum chamber and extend across the chamber from opposed edges of the air pallet with the free ends of the strips overlapped. Air inlet openings are formed at respective edges where the flexible strips and the flexible sheets are sealed together between one side of each strip and an adjacent thin flexible film sheet. Both strip side edges are preferably sealed to said other flexible film sheets form defined air passages, inwardly of the inlet openings. Automatically, at the insertion of a wand bearing air under pressure into the opening at one side of the air pallet, as a result of air flow, between the strip overlappings, a strip acts to seal the opening at the opposite side of the air pallet prior to air pressurization of the plenum chamber by air flow from between the overlapping portions of the flexible film strips into said plenum chamber.

6 Claims, 7 Drawing Figures

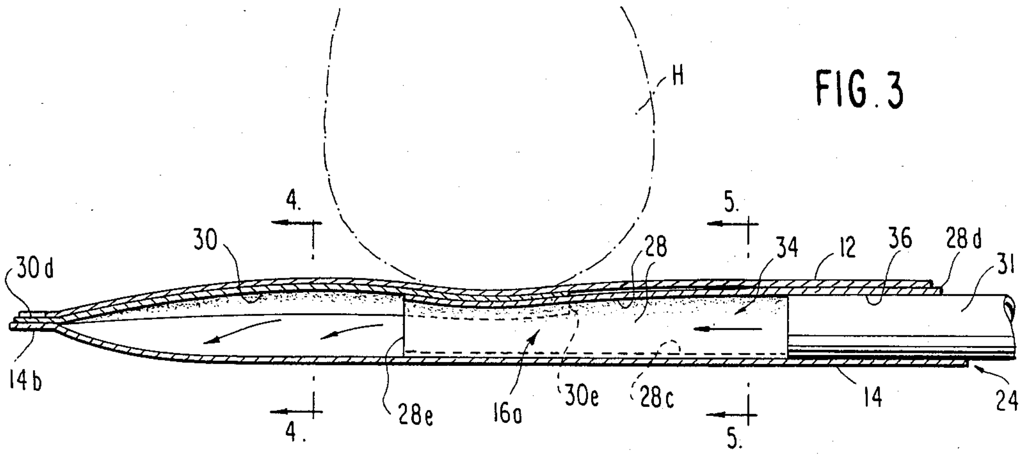
FIG.3
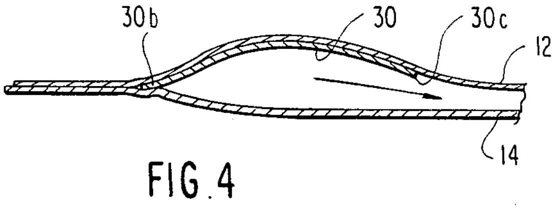
FIG.4
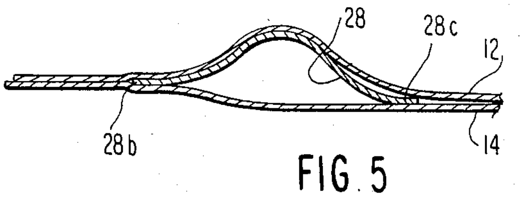
FIG.5
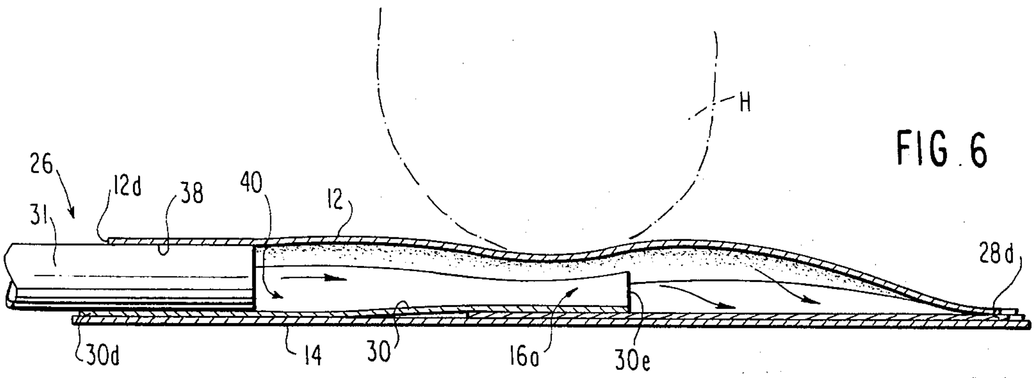
FIG.6
FIG.7
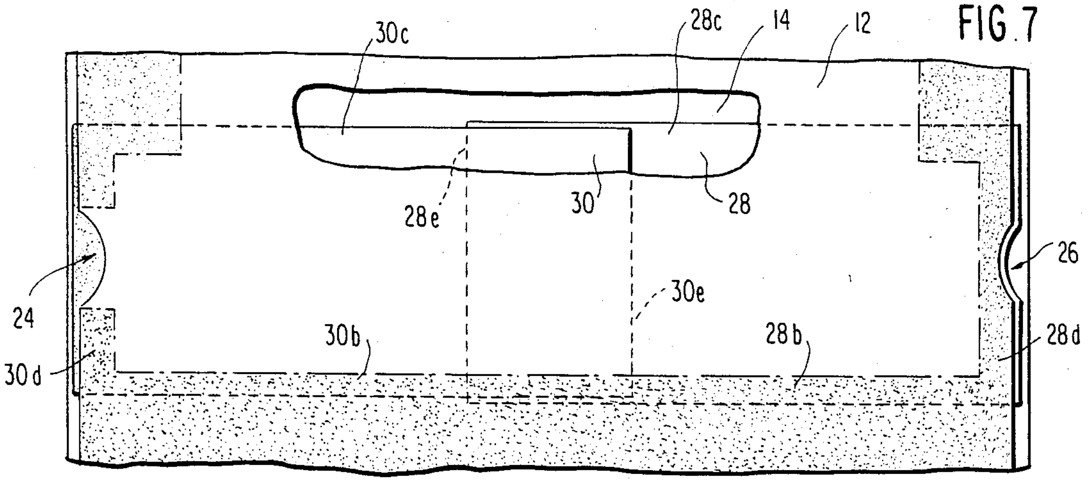

AIR PALLET HAVING MULTIPLE ENTRY INTEGRATED AIR INLET VALVES

BACKGROUND OF THE INVENTION

The present invention has application to an air pallet generally such as that set forth in U.S. Pat. No. 3,948,344 entitled "LOW COST AIR PALLET MATERIAL HANDLING SYSTEM" issued Apr. 6, 1976, and in particular to an air bearing patient mover such as that set forth in U.S. Pat. No. 4,272,856 entitled "DISPOSABLE AIR-BEARING PATIENT MOVER AND VALVE EMPLOYED THEREIN" issued June 16, 1981, of which I am coinventor. Planar air pallets of such type employ at least one flexible material sheet for partially defining a plenum chamber with said one sheet being perforated as by way of small pin holes over a surface area defined by the imprint of the load, which pin holes face an underlying fixed, generally planar support surface. When the plenum chamber is pressurized by low pressure air, the escape of air under pressure through the minute perforations, which open directly to the interior of the plenum chamber, acts to initially jack the load above the flexible sheet and to create a frictionless air film bearing of relatively small height between the support surface and the bottom of the perforated flexible sheet.

In all air pallets including patient movers, it is necessary to provide controlled pillowing of the flexible film or films which may define partially or completely the plenum chamber and to thus establish, by jacking the load to a predetermined height, the ability of the air pallet to ride over surface projections on the underlying support surface. At the same time, excess pressurization of the plenum chamber may cause ballooning of the thin film flexible sheet or sheets, resulting in tilting and rolling of the load off the top of the air pallet. When the load rests on the air pallet prior to pressurization of the plenum chamber, the load tends to press the perforated flexible sheet or sheets into contact with the floor and prevent the entry of air under pressure into the plenum chamber and the subsequent escape of air through the perforations. Air dispersion means are required either interiorly of the plenum chamber or by way of means exterior of the plenum chamber to ensure pressurization of the plenum chamber. Additionally, to permit selective multiple air flow entry to the plenum chamber, such as at the four corners of the patient mover type of air pallet exemplified by U.S. Pat. No. 4,272,856, openings are required within the sealed wall of the dual flexible sheets defining the plenum chamber, either at the sealed edge interface of dual, upper and lower thin flexible sheets, or otherwise. Valve members have been incorporated at the various inlets such that, automatically by air pressurization of the plenum chamber through one of the inlets, the valve members at the other inlets close off those unused inlets to prevent escape of air.

In U.S. Pat. No. 3,948,344, the valves are constituted by the provision of a flap formed at each air inlet as an extension of one of the thin flexible sheets defining a wall of the plenum chamber, such as the bottom flexible sheet bearing the perforations and creating the air bearing. With that flap being a bent over a portion of the sheet internally of the inlet and projecting inwardly into the plenum chamber, by contacting an overlying or underlying opposed sheet or wall member, it functions to seal off and prevent the escape of air through an air inlet at that point by being held in sealing position by developed internal air pressure.

With respect to the patient mover as exemplified by U.S. Pat. No. 4,272,856, each of the multiple air inlets is comprised of at least one outer tube formed of a thin, flexible film material and an inner tube mounted coaxially within the outer tube and comprised of opposed flexible tongues sealed at the ends remote from the plenum chamber to opposite sides of the outer tube with their inner ends being free of each other and from the outer tube. The tongues constitute strips of material of less flexibility than that of the thin flexible film sheets defining either the bottom or top and bottom of the air pallet plenum chamber. As such, during air entry into the plenum chamber through the inlet, the tongues take the curved configuration of the outer tube and are in contact therewith. After pressurization of the plenum chamber, air tending to escape through the inlet causes the tongues to move away from one of the outer tube walls and to press against each other and against the other of the outer tube walls to thereby close off the inlet means. Where multiple inlets are provided, automatically as a result of pressurization of the plenum chamber through one of the inlets, the other unused inlet or inlets are closed off by movement of the tongues away from the outer tube and into contact with each other.

Where the air pallet takes the form of a patient mover, it is desirable to pressurize the plenum chamber starting at the end of the patient mover where the head of the patient rests such that the patient's head rises first during pressurization of the plenum chamber. Jacking of the patient upwardly as a result of plenum chamber pressurization occurs prior to the creation of the air bearing by air escaping from the perforations of the bottom thin flexible sheet. Preferably the air inlet means can be eliminated from the opposite end of the patient mover type of air pallet. Further, it is necessary to insure that during pressurization of the plenum chamber, air does not escape through the second air inlet at the head end of the patient mover to the opposite side, or from any intersecting position as for instance at the same corner, but perpendicular thereto, from that receiving the wand and being subjected to the initial on rush of air under light pressure.

It is, therefore, a primary object of the present invention to provide an improved air pallet and, particularly for a patient mover use in which there is an integration between dual air inlets and their valves of the air pallet which intersects at the same end or extend from both ends of the air pallet, and in which sealing of unused air inlet is insured prior to pressurization of the plenum chamber.

SUMMARY OF THE INVENTION

The invention is directed to an improved air pallet for the frictionless movement of a load supported by a generally rigid planar backing member over underlying generally planar fixed support surface where the air pallet comprises top and bottom walls defining a plenum chamber with at least the bottom wall being formed of a thin flexible sheet material. The bottom wall includes a portion defined by the footprint of the load having a plurality of closely spaced small diameter perforations opening directly into the plenum chamber. Air dispersion means ensures air flow throughout the plenum chamber when the air pallet is under load at the time of air pressurization of the plenum chamber. Means are provided for controlling pillowing of the flexible sheet material to permit jacking of the backing member and the load sufficient to allow the air pallet to accommodate surface irregularities of the load support surface and the backing member, while preventing ballooning of the thin flexible sheet material. Air inlet means open to the plenum chamber for permitting low pressure air flow into the plenum chamber for jacking of the load and for subsequent discharge through the perforations to cause an air film between the bottom wall and the fixed support surface.

The improvement lies in the air inlet means comprising a pair of thin flexible material strips extending transversely, internally of the top and bottom walls along intersecting paths, being of a given width and each strip having one outer lateral edge sealed to a respective one of the top and bottom walls along an edge and being free of the other wall at that edge at least over a portion thereof to form at the non-sealed edge portion, an air inlet opening to the interior of the air pallet at a given side and in line with the opposite side air inlet. The width of the strips are such that the inner ends remote from the air inlet openings overlap each other, whereby upon insertion of a wand bearing air under pressure into one of the air inlet openings, this causes automatically, as a result of the air entry blast, the overlapped portion of one of the strips to press against a given one of the upper and lower walls to close off the air inlet opening not receiving the wand. Thus, the air inlet not subject to air pressurization is effectively and immediately sealed off, this facilitating the air dispersion throughout the plenum chamber, the jacking of the load, and the creation of the thin film air bearing beneath the bottom wall sheet and the underlying generally rigid support surface. Preferably, the thin flexible sheets are additionally sealed along their edges proximate to the plenum chamber, at right angles to the inlet opening, throughout their length including the overlapped portions to respective ones of the top and bottom walls to cause pressurization of the plenum chamber and air flow to the plenum chamber subsequent to air passing completely through the air flow passage created by the selected one of the edge sealed overlapping strips partially defining the active inlet.

BRIEF DESCRIPTION OF THE DRAWINGS

FIG. 3 is a transverse sectional view of the patient mover type air pallet of FIG. 2, taken about lines 3—3, during pressurization of the plenum chamber via one of the dual air inlet and integral valves thereof and with the non-used air inlet being automatically sealed prior to and during air pressurization of the plenum chamber.

FIG. 4 is a longitudinal, sectional view taken about lines 4—4 of FIG. 3.

FIG. 5 is a longitudinal, sectional view taken about lines 5—5 of FIG. 3.

FIG. 6 is a transverse sectional view of the air pallet, similar to that of FIG. 2 but having the opposite side air inlet subjected to air pressurization.

FIG. 7 is a top plan view of an air pallet type patient mover forming a second embodiment of the invention.

DESCRIPTION OF PREFERRED EMBODIMENTS

Figure 1:
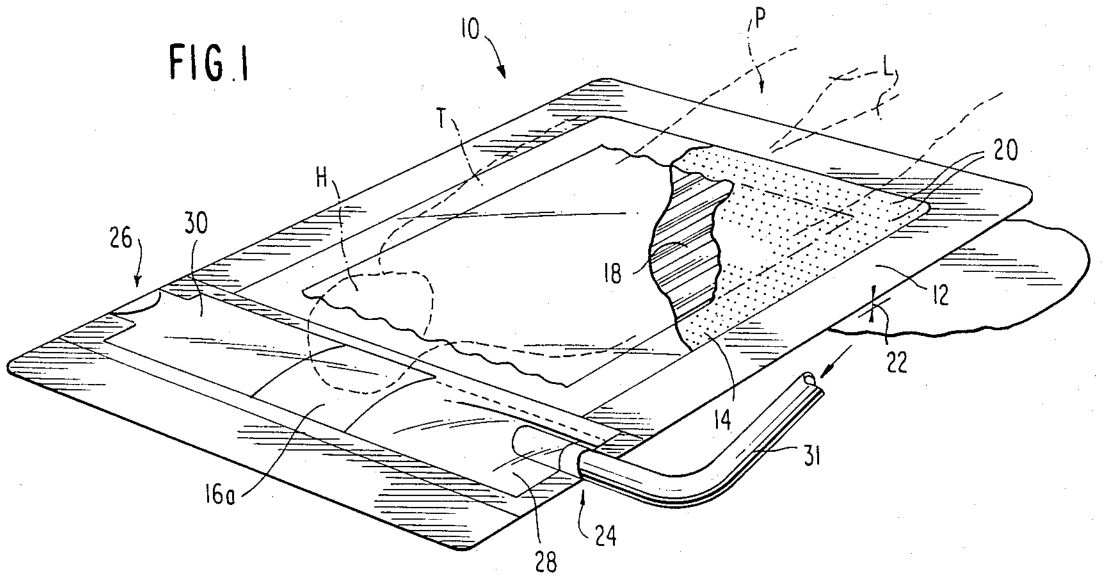
FIG. 1 is a perspective view of a patient mover type air pallet employing the multiple entry air inlets and integrated valve structures forming a preferred embodiment of the present invention.
Figure 2:
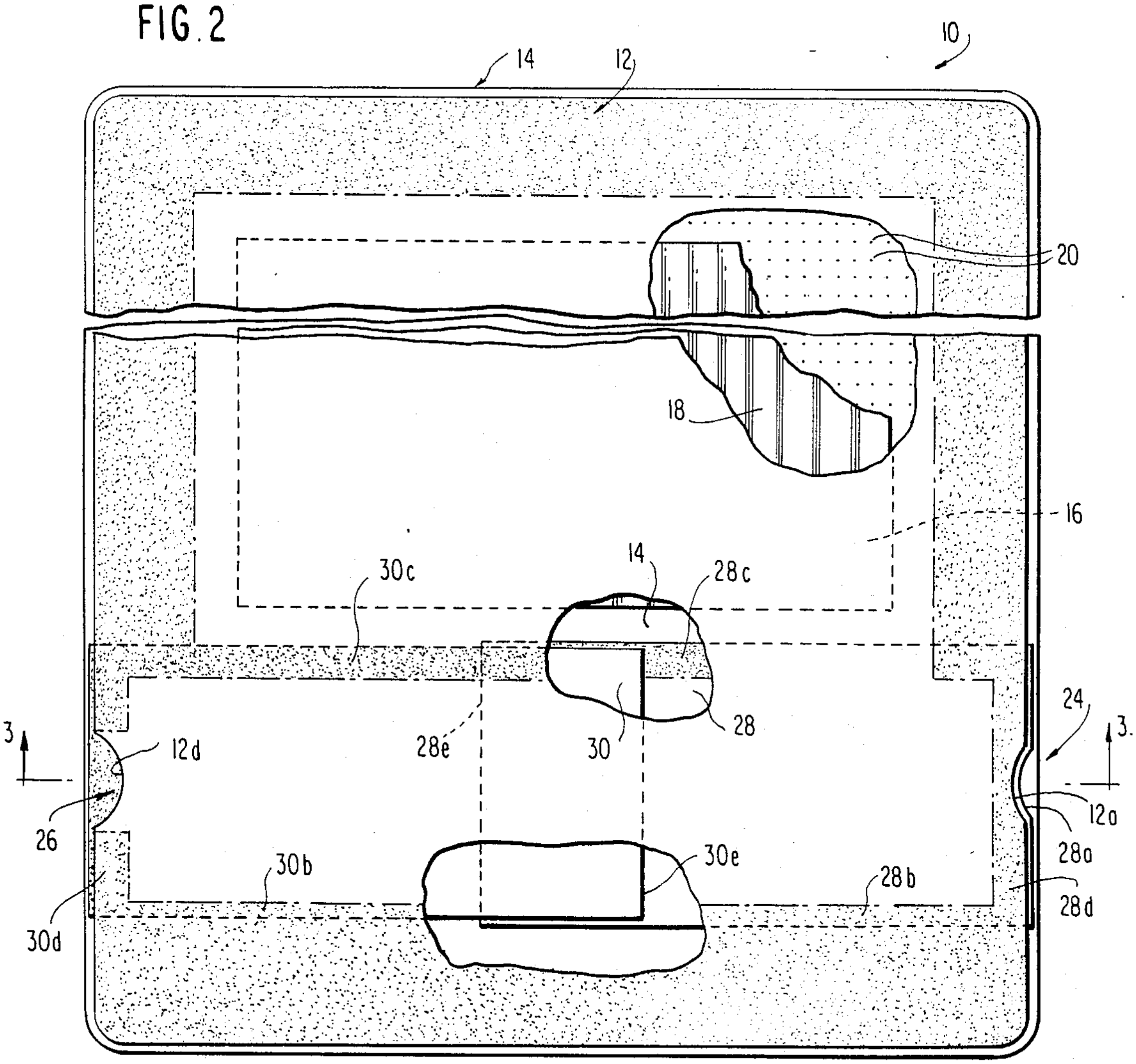
FIG. 2 is a plan view of the patient mover of FIG. 1, partially broken away.

Referring to FIGS. 1–6 inclusive, there is shown a preferred embodiment of the air pallet of the present invention taking the form of a patient mover which is essentially of bag form. The air pallet or patient mover indicated generally at 10 is defined principally by an upper or top thin, flexible sheet indicated generally at 12 and a lower or bottom thin, flexible sheet indicated generally at 14. Each sheets may be formed of similar thin, flexible film material such as polyvinyl chloride or polypropylene, of several mills thickness. The sheets may be sealed together by the localized application of heat to thermo-bond the sheets together, or by sewing the flexible sheets together at their edges, or otherwise. By bonding or sewing the sheets together about their edges, there is defined internally a sealed cavity or air plenum chamber 16. As desired, and in keeping with U.S. Pat. No. 4,272,856, portions of the contacting upper and lower sheets 12 and 14 may be sealed together or sealed off from the central plenum chamber 16 underlying the area of the load defined by the patient P. It is noted that the patient P has his head H resting on a central portion of the air pallet, at one end, with his torso T extending away therefrom and with at least portions of the patient's legs L extending beyond the other end of the air pallet or patient mover 10.

The air pallet may incorporate a relatively rigid backing member such as a semi-flexible plastic sheet 18 within the structure of the patient mover plenum chamber 16 as desired and according to member 34 of U.S. Pat. No. 4,272,856.

Important to the correlation between the air bearing and footprint of the load is the requirement that the lower thin flexible sheet 14 be provided with a plurality of very small diameter, pinhole-type perforations as at 20 underlying the load bearing area or load footprint, such that when the plenum chamber 16 is pressurized with a low pressure gas such as compressed air, the escape of air through the literally thousands of perforations 20 creates a minimial height, low cfm, low pressure air bearing as at 22, FIG. 1.

The present invention is keyed to the improvement in dual air inlet means for effectively pressurizing the plenum chamber 16 and developing the air bearing 22. In accordance with the prior referred to patents, this is achieved utilizing a suitable air compressor which may be portable or otherwise and which includes an air delivery tube or wand 31. Particularly where the air pallet comprises a patient mover, it is preferred to supply the air to the portion 16*a* of plenum chamber 16 underlying the head H of the patient P such that, initially, as the plenum chamber 16 is pressurized, the patient's head H is jacked upwardly prior to any lifting of the chest or other part of the torso T. The air pallet is required to have a pair of air inlets to opposite sides at one corner, opposite ends, etc., and the invention is directed to such multiple entry inlets having integrated, intersecting air inlet valves for controlled instantaneous and effective sealing of one inlet as the wand bearing air under pressure inserted ito the other inlet is supplied with pressurized air for pressurization of the plenum chamber 16 and the creation of the air bearing 22. Air inlets indicated generally at 24 and 26, respectively, are provided in the illustrated embodiments, FIG. 1, to the right and left of the air pallet 10 at the head and foot thereof, and are formed in a simplified manner. In that respect, other than upper and lower sheets 12 and 14, the sole remaining elements of air inlets 24 and 26 comprise elongated rectangular thin film strips, indicated generally at 28 and 30, respectively. Right side strip 28 and left side strip 30 are interposed between upper and lower sheets 12 and 14, at the top or head end of the air pallet or patient mover 10. Strips 28 and 30 are slightly longer than one-half the width of sheets 12 and 14 and are sandwiched between sheets 12 and 14, with their free inner ends overlapped.

Further, both upper sheet 12 and strip 28 are provided with arcuate cutouts as at 12*a* and 28*a*, respectively. Strip 28 is thermobonded, or stitched along upper edge 28*b* and lower edge 28*c* to lower sheet 14. The two arcuate cut edges 12*a* and 28*a* of sheet 12 and strip 28, respectively, are thermobonded or heat sealed to each other, and the straight portion 28*d* of right edge of strip 28 is heat sealed or stitched to and between sheets 12 and 14 at their right side meeting edges, while the left edge 28*e* of strip 28 is free.

Likewise, for strip 30, the arrangement is similar. That is, strip 30 being of a length which is slightly wider than one-half the width of the sheets 12 and 14, overlaps strip 28 at its interior. Thus, the strips 28, 30 have free ends which intersect each other and are overlapped at that intersection to perform self-sealing valving functions. Left edge 30*d* of strip 30 is positioned between left side edges of sheets 12 and 14 and that edge 30*d* is heat sealed or stitched to bottom sheet 14 to create an effective gas tight seal therebetween. The straight edge 30*d* of strip 30 is edge sealed along its complete height to the bottom sheet 14, and is sealed to the upper sheet 12, over a short distance up unto the point where arcuate cutout 12*d* appears within the upper sheet 12. Further, strip 30 is sealed along its upper edge 30*b*, to and between upper and lower sheets 12, 14, while lower edge 30*c* is sealed solely to upper sheet 12, along that edge.

This has the effect of leaving the inner edge 30*e* of strip 30 free although overlapped relative to strip 28.

As may be appreciated, the sandwiching of the inner edge overlapped strips 28 and 30 between upper and lower thin flexible sheets 12 and 14 and the sealing of the same along certain edges to given ones of said sheets have the effect of producing tubular air flow passages 34 and 40 for inlets 24 and 26, respectively. The effect is also to integrate the thin flexible strips so as to act as valves functioning to seal off air flow from the air inlet not being employed for pressurization of plenum chamber 16 during operation of the air pallet or patient mover 10.

Unlike prior U.S. Pat. No. 4,272,856, there is no elastic memory necessary for strips 28 and 30. As may be appreciated, they are normally flat but they have the property of being deflected due to their flexibility to match the change in surface configuration of the flexible sheets 12 and 14 to which they are integrated.

Important to the appreciation of the improvement resides in the action resulting from insertion of a wand bearing air under pressure such as wand 31 into a selected inlet 24 or 26, the nature of the pressurized air flow in pressurization of plenum chamber 16, jacking of the load, and importantly, the lifting of head H of the patient prior to lifting of the patient's torso T, and the automatic sealing of the other air inlet by the integrated valve at that inlet constituted by one of the inner edge overlapped flexible strips. The operation by air pressurization through inlets 24 and 26 in a selective manner may be appreciated by specific reference to FIGS. 3 and 6.

In FIGS. 3, 4 and 5, an air tube or wand 31 is inserted, from right to left, into air inlet passage 34 by projecting the leading end of the wand 31 through inlet opening 36 of left side inlet 24, beneath strip 28 and above the underlying bottom thin flexible sheet 14. The on rush of air is captured within air passage 34 and moves from right to left, until it meets the sealed left side edge 30*d* of overlapping strip 30 and left side edge 14*b* of thin flexible bottom sheet 14 of the air pallet. Due to the overlapping of the left side flexible strip 30 relative to right side strip 28, the air tries to escape from between the overlapped edges 28*e*, 30*e* of strips 28 and 30 by reversing its flow back towards inlet 24. Since the overlapped edges of strips 28 and 30 are free of each other, the air escapes from between the strips, and in escaping, tends to press the right free edge 30*e* of strip 30 upwardly against the upper thin flexible sheet 12, functioning automatically to seal off inlet opening 38. At that time, air is free to move into the plenum chamber 16 by passage between edge 28*c* of strip 28 and the upper thin flexible sheet 12, as well as passing into the plenum chamber 16 by passage between edge 30*c* of left side strip 30 and the bottom thin flexible sheet 14, which are not sealed together along edge 30*c*.

Thus, a key aspect of the invention is the automatic forced closure of the opposite side or otherwise intersecting air inlet valve at the inlet not being utilized for pressurization of the plenum chamber 16 and the subsequent creation of the air film bearing beneath the air pallet or patient mover. The effect of the initial air blast into a given inlet 24 from wand 31 across the air pallet, and towards the opposite seal between the bottom sheet and strip 30, is to flip up the inner free end of strip 30 towards the top thin flexible sheet 12 and to seal off opening 38 of the opposite side inlet 26.

Referring next to FIG. 6, the insertion of pressurized air carrying wand 31, into the inlet opening 38 and between strip 30 and the uper thin flexible sheet 12, causes the air to flow from left to right, initially through air passage 40 across the overlapped upper edge 30*e* of strip 30, and into the space between strip 28 and upper thin flexible sheet 12. This will cause deflection of the underlapped inner edge 28*e* of strip 30 downwardly against the bottom thin flexible sheet 14 to seal off right side inlet opening 36 and to cause air flowing from between the overlapped edges of strips 28 and 30 to enter plenum chamber 16 from the space between the bottom of right side strip 30 and the underlying thin flexible sheet 14, across the unsealed edge 30*c* of the right side strip 30.

Meanwhile, air also enters the plenum chamber between the unsealed edge 28*c* of the right side strip 28 and the top thin flexible sheet member 12. As is depicted in FIG. 6, the initial air blast causes instantaneously and automatically an effective pneumatic force pressing the free edge 28*e* of strip 28 downwardly to seal off inlet opening 36 at the unused left hand air inlet 24 of the air pallet or patient mover 10.

While the illustrated embodiment has been described in conjunction with an arrangement wherein upper edges 28*b* of strip 28 and 30*b* of strip 30 are described as being sealed to and between upper and lower thin flexible sheets 12 and 14 of the air pallet, as seen in FIG. 7, where like elements bear like numerals, it is not necessary that either upper or lower transverse edges of strips 28 and 30 be sealed to appropriate sheets 12, 14. With respect to lower edges 28*c* for strip 28 and 30*c* for strip 30, these edges are not sealed to either top and bottom sheets 14 and 12, respectively, although such structural arrangement insures the desired sequence of sealing off of the opening of the non-used air inlet prior to the plenum chamber 16 being pressurized by air flow into one of said inlets, and thence, jacking of the load upwardly and the creation of air bearing 22. Edges 28*b* and 30*b*, respectively of strips 28 and 30, are sealed in the manner of the first embodiment.

While the illustrated embodiments show the air inlet means as comprising a pair of thin flexible material strips extending transversely, internally of the top and bottom walls, and being of a strip length less than that of the width of the top and bottom walls, and while the opposed air inlets are at the top or head end of the patient mover type air pallet in the illustrated embodiments, the invention has application where they may not only be at the same end but the air inlets may be at right angles to each other at a common corner at their head end or foot end of the patinet type air pallet for example. Additionally, in this case, the air inlets and their flexible strips functioning as automatic valves intersect at right angles to each other rather than having overlapped intersecting portions, as in the illustrated embodiment, coming from opposite sides. In a further variation, which also is not shown, a strip and thus an inlet formed thereby may extend from the full length of the air pallet patient mover, for instance from the head end, while a laterally intersecting inlet and laterally intersecting strip may extend at right angles thereto from one side of the air pallet at the bottom or foot end of the air pallet.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An air pallet for the frictionless movement of a load supported by a generally rigid planar backing member over an underlying generally planar fixed support surface, said air pallet comprising top and bottom walls defining a plenum chamber, at least said bottom wall being formed of a thin flexible sheet material, said bottom wall including a portion defined by the footprint of the load having a plurality of closely spaced small diameter pin hole type perforations opening directly into the plenum chamber, air dispersion means for insuring air flow throughout the plenum chamber when the air pallet is under load at the time of air pressurization of the plenum chamber, means for controlling pillowing of the flexible sheet material to permit jacking of the backing member and the load sufficient to allow the air pallet to accommodate surface irregularities of the load support surface and the backing member while preventing ballooning of the thin flexible sheet material, air inlet means opening to the plenum chamber for permiting low pressure air flow pressurization of the plenum chamber for jacking the load and for subsequent discharge through the perforations to create an air film between the bottom wall and the fixed support surface, the improvement wherein:

said air inlet means comprises a pair of thin flexible material strips extending internally of said top and bottom walls, being of a given length, each strip having one outer lateral edge sealed to a respective one of said top and bottom walls along said edge, and being free of said other wall at said edge at least along a portion thereof to form, at the non-sealed edge portion, an air inlet opening to the interior of said air pallet along a given periphery, and wherein the length of said strips are such that their inner ends, remote from the air inlet openings, intersectingly overlap each other, such that insertion of a wand bearing air under pressure into one of said inlet openings causes automatically, as a result of the air entry blast, the overlapped portion of one of said strips to press against a given one of said upper or lower walls to effectively and immediately close off the air inlet opening not receiving said wand, thus sealing off said non-used inlet opening prior to movement of the air into said plenum chamber, thereby facilitating air dispersion throughout the plenum chamber, jacking of the load and the creation of the thin film air bearing beneath the bottom wall sheet and the underlying generally rigid support surface.

2. The air pallet as claimed in claim 1, wherein said air inlet means constitutes a pair of thin flexible material strips extending transversely internally of the top and bottom walls being of a given length which is less than the width of the top and bottom walls and wherein the air inlets open to the interior of the air pallet from opposed given sides and opposite the air inlet opening at the other side with the length of the strips being such that their inner ends remote from the air inlet openings terminate overlapping each other.

3. The air pallet as claimed in claim 2, wherein said thin film flexible strips are additionally sealed along their edges proximate to the plenum chamber at right angles to the inlet opening throughout their length including the overlapped portions to respective ones of said top and bottom walls to cause pressurization of the plenum chamber and air flow thereto subsequent to air passing completely through the air flow passage created by said edge sealed overlapping strips.

4. The air pallet as claimed in claim 3, wherein said top and bottom walls both comprise thin flexible sheets, said thin flexible strips along upper and lower edges at right angles to the air inlet openings are sealed to respective ones of said top and bottom sheets, thereby forming the air inlet passage therethrough over their complete lateral width from the sealed outer edge at said inlet opening to their inner, overlapping free edges to insure automatic, instantaneous air pressure sealing of the free edge of the thin flexible strip of said opposite non-used inlet to an overlying or underlying thin flexible sheet and to thereby close off the inlet opening of the non-used air inlet.

5. The air pallet as claimed in claim 2, wherein said top and bottom walls both comprise thin flexible sheets, said thin flexible strips along upper and lower edges at right angles to the air inlet openings are sealed to respective ones of said top and bottom sheets, thereby forming the air inlet passage therethrough over their complete lateral width from the sealed outer edge at said inlet opening to their inner, overlapping free edges to insure automatic, instantaneous air pressure sealing of the free edge of the thin flexible strip of said opposite non-used inlet to an overlying or underlying thin flexible sheet and to thereby close off the inlet opening of the non-used air inlet.

6. The air pallet as claimed in claim 1, wherein said thin film flexible strips are additionally sealed along their edges proximate to the plenum chamber at right angles to the inlet opening throughout their length including the overlapped portions to respective ones of said top and bottom walls to cause pressurization of the plenum chamber and air flow thereto subsequent to air passing completely through the air flow passage created by said edge sealed overlapping strips.

* * * * *